United States Patent [19]

Bates et al.

[11] 3,907,008

[45] Sept. 23, 1975

[54] INSERTION APPARATUS

[75] Inventors: Erwin F. Bates, Binghamton; Michael D. Snyder, Chenango Bridge, both of N.Y.

[73] Assignee: Universal Instruments Corporation, Binghamton, N.Y.

[22] Filed: Aug. 29, 1974

[21] Appl. No.: 501,682

[52] U.S. Cl. ................. 140/105; 227/88; 29/203 D

[51] Int. Cl.$^2$ ........................................... B21F 45/00

[58] Field of Search........... 29/203 B, 203 D; 140/1, 140/105; 72/294, 324, 326, DIG. 10; 227/89, 90, 88

[56] References Cited

UNITED STATES PATENTS

| | | | |
|---|---|---|---|
| 2,893,010 | 7/1959 | Stuhre | 29/203 |
| 3,141,492 | 7/1964 | Petree et al. | 29/203 |
| 3,149,340 | 9/1964 | Gagnon | 227/90 |
| 3,193,171 | 7/1965 | Johnson et al. | 140/105 |
| 3,414,024 | 12/1968 | Anderson et al. | 29/203 |
| 3,593,404 | 7/1971 | Ragard | 29/203 |

*Primary Examiner*—Lowell A. Larson
*Attorney, Agent, or Firm*—Fidelman, Wolffe & Leitner

[57] ABSTRACT

An apparatus for receiving a length of taped electrical components, severing them from the tapes, preforming one lead into an L-shape and then bending said leads each 90° so that the bent portions are parallel and said component body is parallel to said leads.

14 Claims, 9 Drawing Figures

INSERTION APPARATUS

This invention relates to an apparatus for receiving a taped length of electrical components severing the taped lead portions, preforming one lead and then bending the leads about an area in one lead 90° to produce parallel portions of said component. The bent and formed lead extremities are then further formed by a lead severing and forming assembly.

This invention is used to automatically take a length of taped electrical components, in the form in which they are usually shipped, and make them into a form in which they may be placed, by hand or automatically, in an electrical assembly.

Accordingly, it is an object of this invention to provide an apparatus for receiving taped electrical components and forming them into a predetermined shape.

It is a further object of this invention to provide an apparatus for severing and bending leads of an electrical component into a predetermined shape.

These and other objects of this invention will become apparent when reference is had to the accompanying specification and drawings in which.

Figure 1:
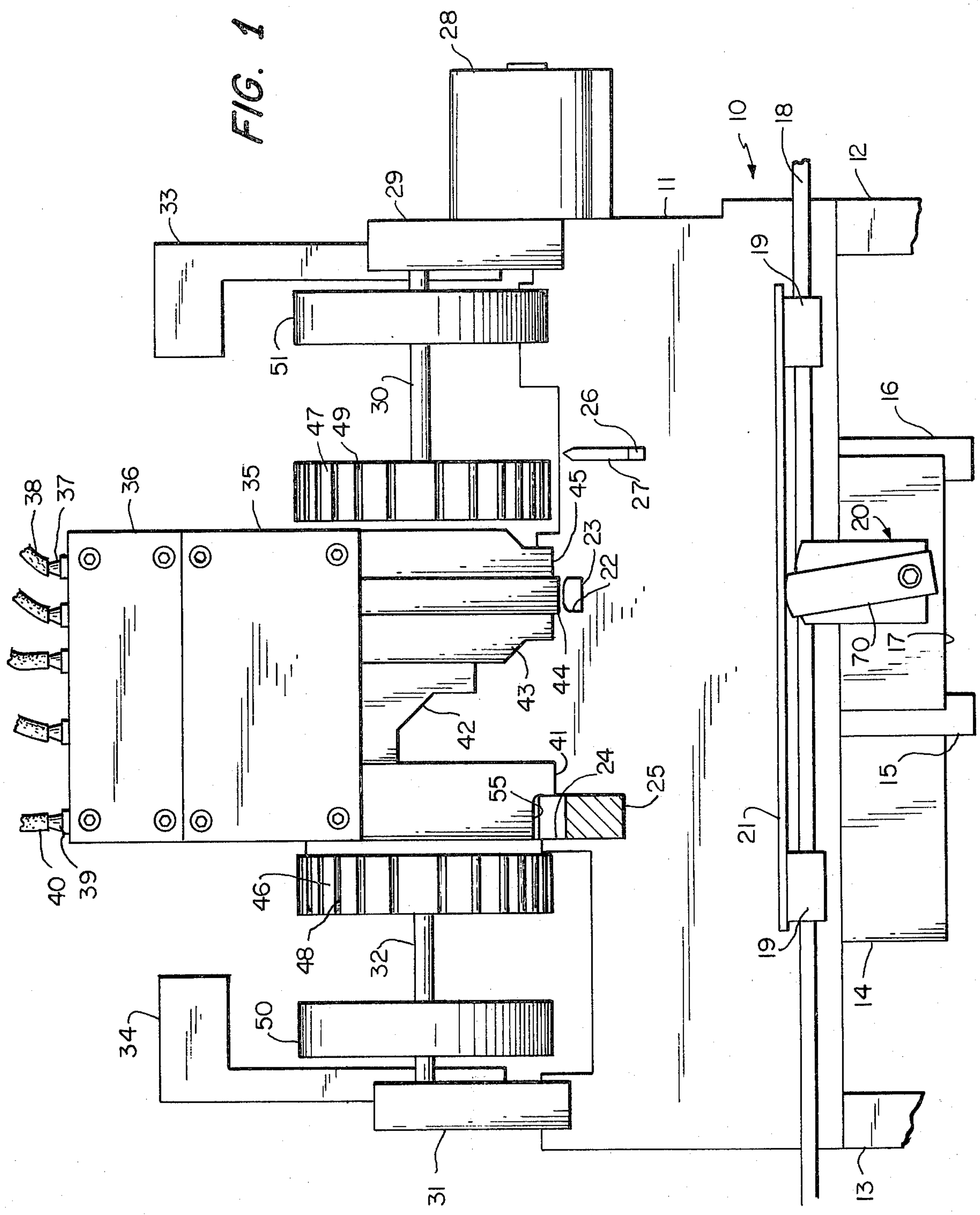
FIG. 1 is a front view of the forming apparatus.

Referring to FIG. 1, there is shown the apparatus designated as 10. It consists of a main housing 11 having supporting legs 12 and 13. A lower member 14 supports vertical guides 15,16 on which a support member 17 is mounted for vertical movement. Member 17 is controlled by a pneumatic cylinder (not shown) which enables it to rise to the position shown or move downwardly. Mounted on member 17 is a lead shearing and forming mechanism 20 which will be described later. A pivotally mounted bar 70 is adapted to be swung by a pneumatic cylinder (not shown) under a flat plate 21' which is supported on housing 11 by supports 18 and 19.

There are two apertures in housing 11, namely 24 and 22 in which members 23 and 25 are respectively mounted for Z-axis movement and member 25 is also mounted for vertical movement.

A motor 28 is mounted on the side of housing 11 and drives through gears (not shown) in assemblies 29 and 30, a pair of shafts 30 and 32. Mounted on the shafts are indexing wheels 46 and 47 having lead receiving grooves such as 48 and 49. Also mounted on the shafts are a pair of tape supporting wheels 50 and 51.

Mounted on housing 11 between indexing wheels 46 and 47 is a central assembly 35 which slidably receives component engaging members 41, 42, 43, 44 and 45. These members are mounted for vertical sliding movement within assembly 35 and are activated by pistons (not shown) contained in pneumatic assembly 36. A plurality of nipples such as 37,39 receive pneumatic hoses such as 38,40.

The entire apparatus, with the exception of motor 28, is controlled pneumatically through pneumatic cylinders. The cylinders can be operated sequentially by a central cam operated pneumatic control or be controlled by a tape reader, which in turn, operates the pneumatic central control. Motor 28 indexes each time an operation is completed to bring another taped component into line for forming. While a pneumatic mode of control is contemplated, other means (such as mechanical, electrical or hydraulic means) may be employed.

Member 21 is a printed circuit board into which components are to be inserted after forming. A pair of guides 33,34 are located atop assemblies 29,31, respectively, to guide the tape containing the components.

Figures 2, 9:
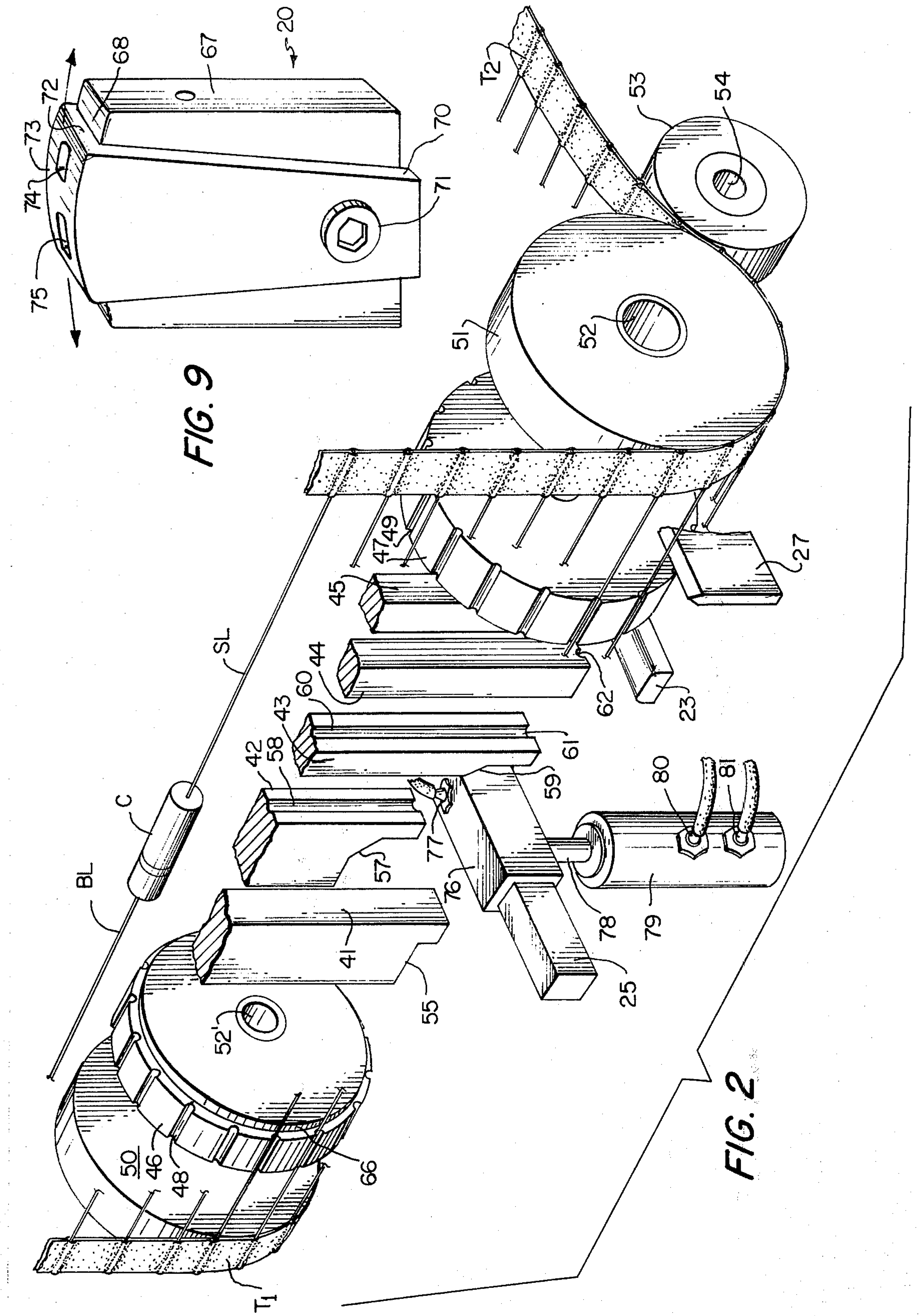
FIG. 2 is an exploded partial view of the major components of the apparatus.
FIG. 9 is a perspective view of the lead extremity severing and forming assembly.

FIG. 2 shows a partial exploded view of the apparatus. The indexing wheels are shown engaging the portions of the leads, BL and SL, between the components C, and the taped end portions $T_1$ and $T_2$. The taped portions $T_1$ and $T_2$ are shown riding on the periphery of tape supporting wheels. The tape supporting wheels, as well as the index wheels, have bushings 52, 52' and the wheels can be locked into any position on shafts 30 and 32 by locking flanges (not shown). This is for adjusting to the width of taped component being formed.

Figure 3:
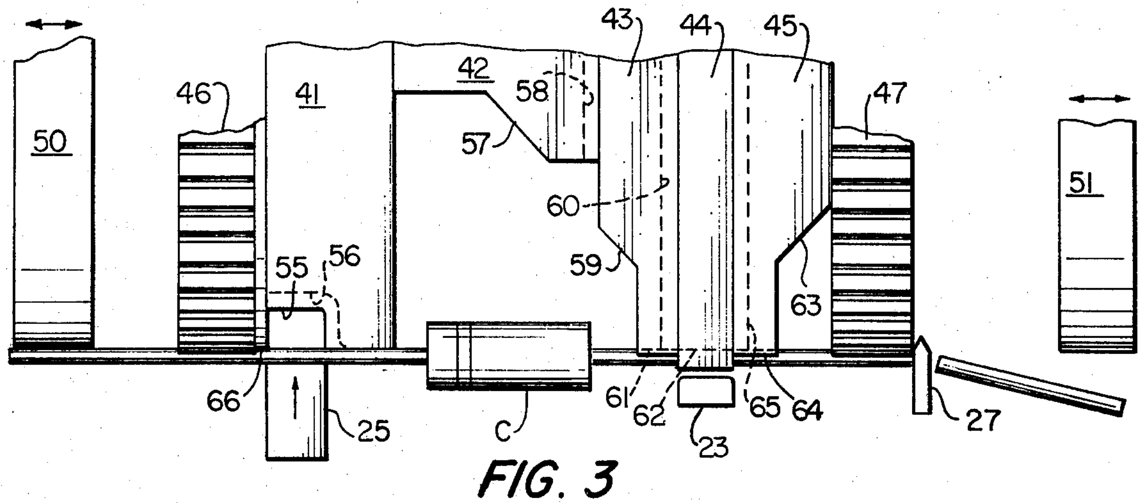

As shown in FIG. 2, bent lead forming member has a recessed area 55 which is grooved as at 56 (FIG. 3). Guide member 42 is grooved as at 58 and is cut away at 57. Component bending member 43 is grooved as at 60 to provide a guiding function and is partially grooved at 61 so as to engage the lead prior to and during bending. Lead holding member 44 has a full groove 62 in the base thereof for holding the lead in conjunction with member 23 during the forming process. Straight lead portion forming member 45 has a groove 64 for engaging and guiding the SL portion of the lead and is cut away at 63 (FIG. 3). Member 43 is cut away at 59.

As seen, the taped components are fed from overhead through guides 33,34, the leads engage grooves 48,49, the taped portions $T_1$ and $T_2$ engage wheels 50 and 51 and the components and leads are indexed into position under the forming members. As the taped portions are severed, buffer wheels such as 53 having bushing 54, take up the slack. The buffer wheels are free wheeling on shafts (not shown) are are in peripheral engagement with wheels 50 and 51. They are made of soft rubber or the like. Wheel 46 has a flange 66 thereon against which the edge of cutter and BL former 25 acts to sever portion $T_1$ from the component to be formed.

Former 25 is slidably mounted to a cylinder 76 having a pneumatic fitting 77 for Z-axis movement. Cylinder 76, in turn, is mounted to piston 78 of pneumatic cylinder 79 for limited vertical movement. Fittings 80 and 81 connect cylinder 70 with the pneumatic supply. Thus, member 25 can be moved on a Z-axis and Y-axis. Cutter 27, seen protruding from slot 26, is fixed in position and cuts as the lead is indexed into position. Member 23 is mounted for Z-axis movement only.

Referring now to FIGS. 3–7, the sequence of cutting, forming and lead severing and forming operations is illustrated. In FIG. 3, the still taped component and lead are shown as indexed into position by wheels 46 and 47. Cutter and former member 25 is shown extended and aligned under recess 55 of member 41. The groove 62 of member 44 is shown grasping the SL (straight lead) portion of the lead over holding member 23. Note that member 23 is slightly rounded at its top edges to accomodate the forming process.

Grooves 61 and 64 of members 43 and 45, respectively, are shown engaging the top of the SL portion adjacent to member 44. Cutter 27 is shown in position having cut the SL portion adjacent to taped portion $T_2$, having acted against the edge of wheel 47.

It should be noted that prior to and during the indexing of the component C, members 41-45 are in a position slightly higher than shown. Once the component is in position, the members move downwardly to the position shown in FIG. 3. During indexing and this downward movement, members 23 and 25 have remained in position under the indexed component leads.

Figure 4:
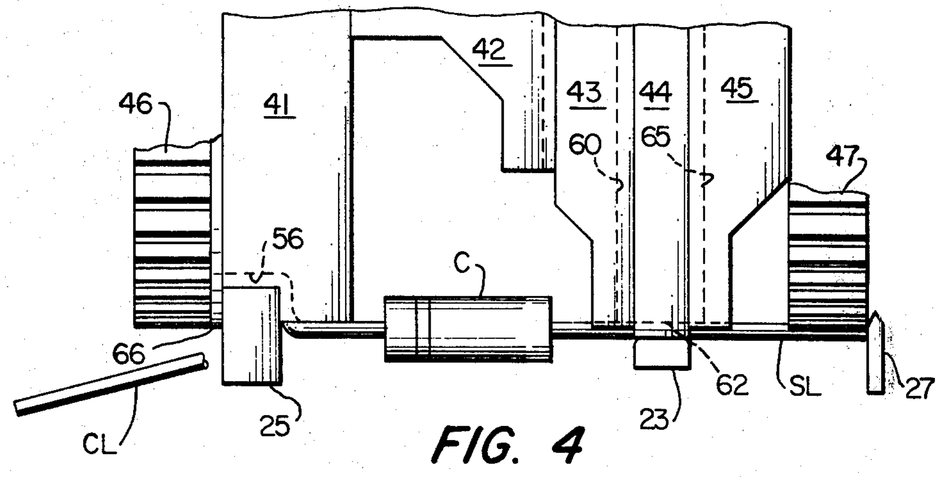

FIG. 4 shows member 25 having severed a cut lead portion (CL) with tape $T_1$ against flange 66 and having formed the bent lead portion (BL) into groove 56 of member 41. Also, cutter 27 is shown as having severed tape $T_2$ and a cut lead portion (CL).

Figure 5:
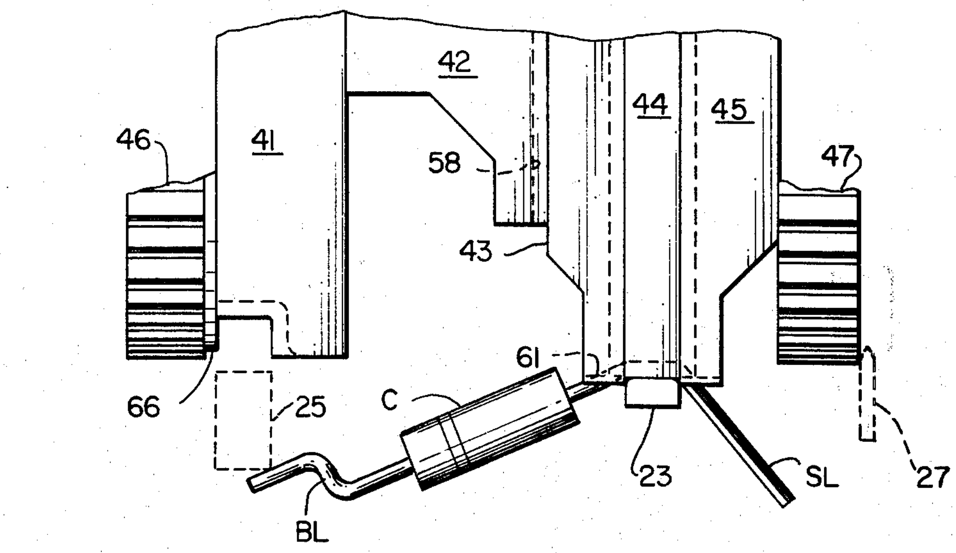

FIG. 5 shows member 25 recessed and members 43 and 45 commencing their downward movement to form the component C and bent lead portion BL and the straight lead portion SL. Side grooves 60 and 65 are acting in conjunction in base grooves 61 and 64 and the rounded top portion of member 23 to smoothly bend the component leads 180°. (Note 45 continues down to envelop the full lead length.)

Figure 6:
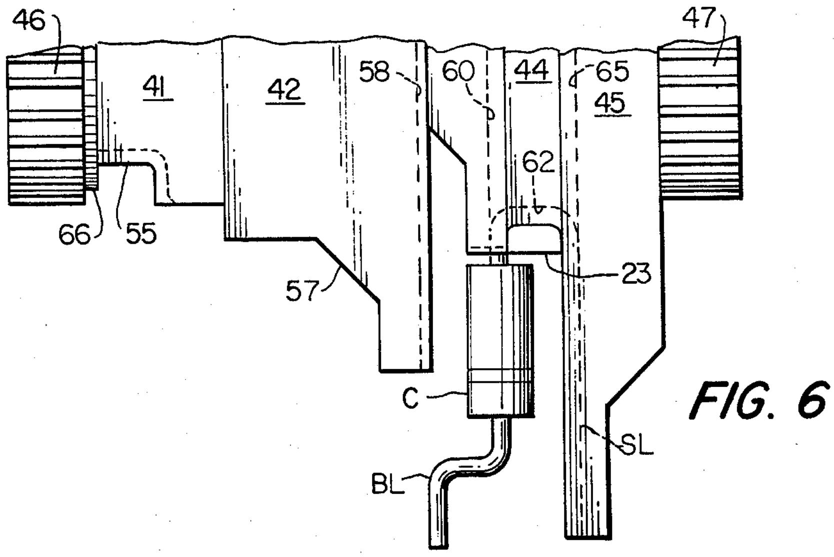
FIGS. 3–7 show the series of forming operations on the component.

FIG. 6 shows the component C and its leads BL and SL fully bent into desired position with guide member 42 commencing to descend. Note that the majority of the BL portion is parallel to the SL portion. Once the groove 58 engages the BL portion, the member 23 retracts and member 42-45 descend and carry the formed component down to a position where the ends of the SL and BL portions extend through two holes 90,91 in printed circuit board 21.

Mounted below plate 21 is assembly 20. This assembly is for the purpose of severing and for forming the lead ends. The exact operation will depend on the type of application the component is to be used in.

Assembly 20 consists of a main member 67 having a rounded or arcuate top with dispensing ports 68 and 69. Member 70 is mounted by screw 71 to the end of a shaft (not shown) which is coupled to a rotative two position pneumatic positioning member (not shown). The top 72 of member 70 overlies the arcuate top of member 70 (FIG. 9) and has forming grooves and apertures 74,75 therein. Member 70 has reciprocal arcuate movement and moves from one aperture alignment position to another.

Figures 7, 8:
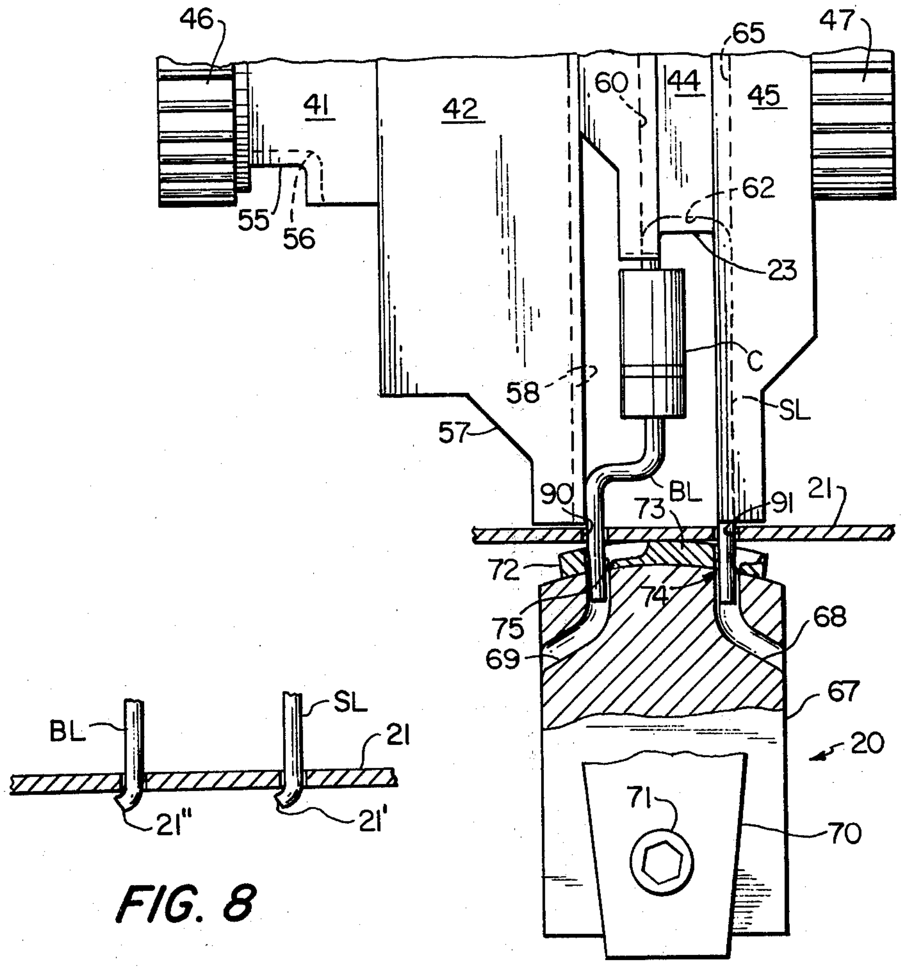
FIG. 8 is a partial view of the formed component lead extremities.

FIG. 8 shows the leads 21'' and 21' being severed and formed. This is the result of movement of member 70 from the position shown in FIG. 7. After severing and forming, the assembly 20 moves downwardly.

While only one embodiment of this invention has been shown and described, it will be obvious to those of ordinary skill in the art that many modifications and changes may be made without departing from the scope of the appended claims.

What is claimed is:

1. An apparatus for continually forming taped electrical components having a body portion and first and second coaxial lead portions extending therefrom in opposite directions, said components being parallel taped by two tapes securing their lead extremities, said apparatus comprising means to receive a taped length of said taped components, means to index components sequentially into a forming position, means for holding one lead portion adjacent but spaced from said body component, means to sever said taped lead extremities from said leads, and means to form the severed extremity of said first lead portion, means for engaging a lead portion and bending said second lead portion about said holding means so that said body portion is parallel to the second lead portion.

2. An apparatus as in claim 1 wherein said means to form the severed extremity of said first lead portion is adapted to form an L-shaped bend on said first lead portion.

3. An apparatus as in claim 1, wherein said means to bend said second lead portion about said holding means comprises a plurality of vertically slidable members for engaging said lead portions.

4. An apparatus as in claim 3, wherein said holding means includes a member slidable along a Z-axis which is adapted to support a portion of said second lead portion and a vertically slidable grooved member to hold said second lead portion on said slidable member.

5. An apparatus as in claim 4, wherein said means to form said first lead portions comprises a receiving member having an L-shaped recess therein and a vertically movable member to sever the taped extremity and to form a part of said first lead portion into an L-shape.

6. An apparatus as in claim 5 wherein said L-shaped recess has a lead receiving groove therein.

7. An apparatus as in claim 6 wherein said apparatus includes means for further bending the severed lead extremities.

8. An apparatus as in claim 1 and including vertically movable means for receiving the extremities of said components after severing and forming and further bending and severing them.

9. An apparatus as in claim 1 including a pneumatic control means.

10. An apparatus as in claim 1 wherein said means for severing said taped extremities comprise a pair of members movable along a Y-axis.

11. An apparatus for severing and forming parallel leads of electrical components, said apparatus adapted to be mounted beneath a circuit board into which said components are to be inserted, said apparatus comprising a body member, said body member having an upper arcuate surface, a pair of through ports in said body member, one end of each port opening onto said arcuate surface, a unitary severing and forming means adapted to ride on said surface, said severing and forming means including apertures therein adapted to align with the port openings in said body member and to receive therewith the ends of said component leads, said means, when moved in relation to said surface, adapted to sever and form said component leads in a single vertical plane.

12. An apparatus as in claim 11, wherein said means has forming grooves adjacent said apertures, the initial movement of said means in one direction adapted to sever the leads at the surface contact and the continued movement in the same direction adapted to form and clinch said leads by the action of said grooves.

13. An apparatus as in claim 12, wherein said grooves are on the same peripheral area of each aperture.

14. An apparatus as in claim 12, wherein said means is adapted to move in an arcuate manner over said surface.

* * * * *